No. 804,778. PATENTED NOV. 14, 1905.
G. W. SMITH.
YIELDABLE GEAR.
APPLICATION FILED JUNE 29, 1904.
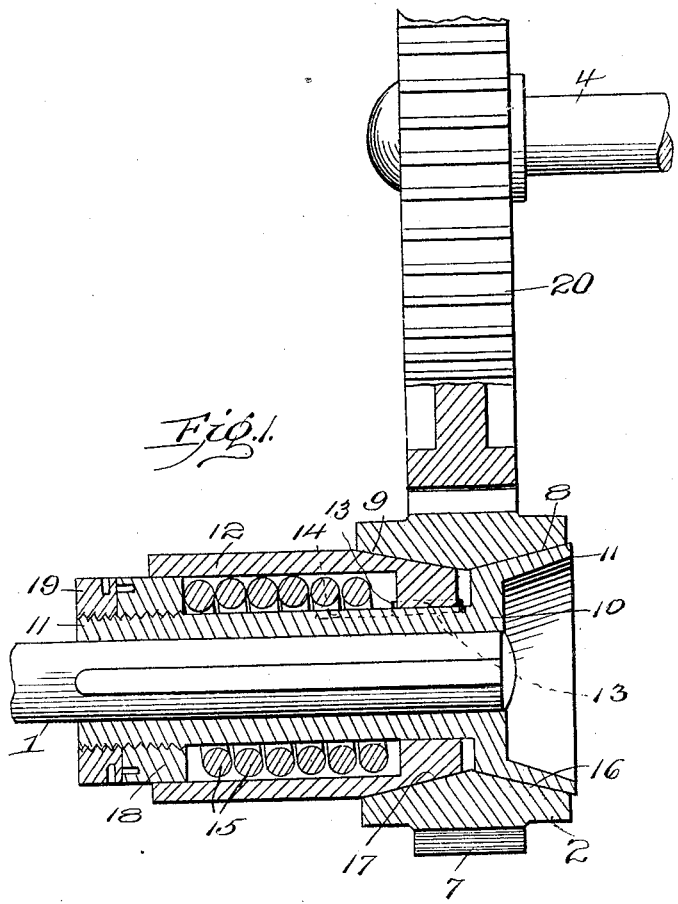
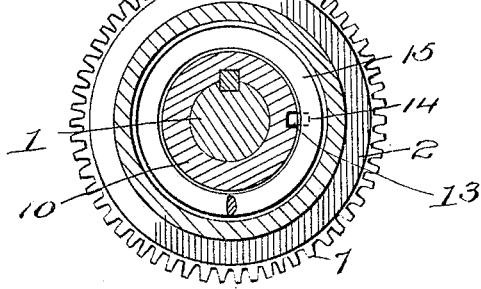
WITNESSES:
J. M. Fowler Jr
Cassell Severance
INVENTOR
George W. Smith,
BY
Mason, Fenwick & Lawrence
Attorneys

UNITED STATES PATENT OFFICE.

GEORGE W. SMITH, OF ROCKFORD, ILLINOIS, ASSIGNOR TO THE INGERSOLL MILLING MACHINE COMPANY, OF ROCKFORD, ILLINOIS, A CORPORATION OF ILLINOIS.

YIELDABLE GEAR.

No. 804,778.  Specification of Letters Patent.  Patented Nov. 14, 1905.

Application filed June 29, 1904. Serial No. 214,680.

*To all whom it may concern:*

Be it known that I, GEORGE W. SMITH, a citizen of the United States, residing at Rockford, in the county of Winnebago and State of Illinois, have invented certain new and useful Improvements in Yieldable Gears; and I do hereby declare the following to be a full, clear, and exact description of the invention, such as will enable others skilled in the art to which it appertains to make and use the same.

The present invention relates to improvements in gears, and particularly to improvements in yielding gears for driving machinery; and the object of the invention is the provision of a gear which will be capable of transmitting motion which is positive under normal conditions and yet is capable of a release in the event of obstruction, a matter which is very essential in the operation of certain machines—such, for instance, as milling-machines.

The invention comprises certain novel constructions, combinations, and arrangements of parts, as will be hereinafter fully described and claimed.

In the accompanying drawings, Figure 1 is a vertical sectional view through the gear constituting the present invention. Fig. 2 is a transverse sectional view through the slip clutch-gear.

In machines of various kinds, and especially in feed mechanisms for milling-machines, it is desirable to use mechanism which is practically positive in its transmission of power under normal conditions, but which is capable of yielding or slipping slightly under the unusual strain of an obstruction or in the event of the sudden changing of the speed-altering portion of the mechanism.

In the accompanying drawings I have illustrated a practical embodiment of my invention, in which is shown a power-transmitting shaft 1, carrying a pinion 2, which drives any suitable machinery. In the drawings the pinion or gear 2 is shown as meshing with a gear 20, secured to a shaft 4, which is to be driven. The pinion 2 is connected with the shaft 1 by suitable means for driving the said pinion to the fullest extent of the feed-power under normal circumstances, but is capable of being released under unusual strain, as when changing from one speed to the other or when some obstruction interferes with the movement of the mechanism driven. I prefer to form the pinion 2 with a rim portion carrying gear-teeth 7, the inner surface of the rim portion being provided with oppositely-facing beveled surfaces 8 and 9. The rim portion is connected with the shaft 1 by means of a hub 10, formed in two parts, one part, as 11, being keyed to the shaft 1, while the other part 12 is movable with respect to the shaft 1 and also with respect to the fixed portion 11. The fixed portion 11 is formed with an elongated sleeve fitting upon the shaft 1, and the movable portion 12 surrounds and slides thereon. The said movable portion 12 is provided with a spline, as at 13, which moves in a groove 14, formed upon the sleeve of the fixed portion 11. A spring 15 surrounds the sleeve of the fixed portion 11 and is located within an annular recess formed within the movable member 12. The fixed portion 11 is provided with a beveled surface 16, which bears against the bevel-face 8 of the gear 2, while the movable member 12 is formed with a beveled face 17, which engages the beveled surface 9 of the said pinion 2. The spring 15 is held against the inner portion of the movable member 12 by means of a nut 18, which projects into and guides the member 12 and engages threads upon the sleeve of the fixed member 11 and is clamped in this adjusted position by a locking nut or ring 19, also engaging the threads of the member 11. The tendency of the spring 15 is to force the beveled portion 17 of the movable member 12 toward the beveled head 11 of the fixed member and in this manner clamp the pinion 2 with sufficient tightness upon the shaft 1 to drive the feeding mechanism of the milling-machine. The spring 15 is made of sufficient tension to prevent the pinion 2 from slipping with respect to the shaft 1 under the application of suitable power for running the feed mechanism under ordinary circumstances. When, however, the speed is changed by the speed-gearing which operates in connection with such pinion, the extra strain upon the teeth of the gears will be compensated for by the yielding of the spring-actuated hub of the pinion 2 momentarily as the change in the speed is made. The compression of the pinion-hub 10 by the spring 15 is not so great but that the pinion may slip upon said hub in the event of some foreign substance, tool, or other obstruction clogging the machinery so that it cannot move temporarily. In both instances the yielding hub prevents the danger of stripping the teeth from the gears of the speed-changing mechanism. It will be evident that other spring-controlled means for connecting the pinion with the shaft may be employed, if desired, without departing from the spirit of the invention, though the form described is the preferable one.

Having thus fully described my invention, what I claim as new, and desire to secure by Letters Patent, is—

A feeding mechanism comprising a shaft, a ring-gear having a double-beveled inner periphery, a fixed hub member secured to the shaft between said shaft and gear, a sleeve integral therewith, a recessed movable hub member between the sleeve and gear, said members having oppositely-beveled faces for bearing on the beveled faces of the gear, and a guide and retaining device adjustably secured on the sleeve and projecting into the movable member, a spring in said member and bearing at opposite ends upon the end of the recess and the guiding device respectively, for holding the hub members yieldably clamped upon the gear.

In testimony whereof I hereunto affix my signature in presence of two witnesses.

GEORGE W. SMITH.

Witnesses:
VERA JOHNSTON,
W. C. STEVENS.